United States Patent [19]
Ohno et al.

[11] Patent Number: 5,385,806
[45] Date of Patent: Jan. 31, 1995

[54] OPTICAL INFORMATION RECORDING MEDIUM

[75] Inventors: Eiji Ohno, Toyonaka; Noboru Yamada, Hirakata; Masatoshi Takao, Osaka, all of Japan

[73] Assignee: Matsushita Electric Industrial Co., Ltd., Osaka, Japan

[21] Appl. No.: 842,731

[22] Filed: Feb. 26, 1992

Related U.S. Application Data

[63] Continuation of Ser. No. 540,445, Jun. 15, 1990, abandoned, which is a continuation of Ser. No. 253;213, Oct. 4, 1988, abandoned.

[30] Foreign Application Priority Data

Oct. 5, 1987 [JP] Japan .................................. 62-251039

[51] Int. Cl.$^6$ .............................................. G03C 1/705
[52] U.S. Cl. ...................................... 430/270; 430/271; 430/272; 430/273; 430/19; 430/944; 430/945; 428/64
[58] Field of Search ................ 430/346, 495, 945, 270, 430/19, 944, 272, 271, 273; 346/135.1; 428/64

[56] References Cited

U.S. PATENT DOCUMENTS

| | | | |
|---|---|---|---|
| 3,907,566 | 9/1975 | Inoue et al. | 430/495 |
| 4,198,237 | 4/1980 | Nahara et al. | 430/415 |
| 4,383,029 | 5/1983 | Yamada et al. | 430/541 |
| 4,434,427 | 2/1984 | Terao et al. | 346/135.1 |
| 4,499,178 | 2/1985 | Wada et al. | 430/495 |
| 4,798,660 | 1/1989 | Ermer et al. | 204/192.17 |
| 4,837,127 | 6/1989 | Ohara et al. | 430/270 |

FOREIGN PATENT DOCUMENTS

0237783A3 9/1987 European Pat. Off. .
0237783A2 9/1987 European Pat. Off. .

OTHER PUBLICATIONS

Hawleys Condensed Chemical Dictionary, 11th edition, Van Nostrand Reinhold Company, N.Y., "Alloy".
"Alloy Capable of Varying Spectral Reflectance and Recording Material"; vol. 10 No. 321 (C-382) [2377] Oct. 31, 1986.

*Primary Examiner*—Christopher D. Rodee
*Attorney, Agent, or Firm*—Wenderoth, Lind & Ponack

[57] ABSTRACT

This invention, related to an optical information recording medium for recording, reproducing and erasing information by causing changes in the optical constant by using light, heat or other means, is intended to propose a recording film material of a novel composition in order to realize higher transfer rate of signals. Specifically, it is an alloy composed of indium (In) and A and B (A is at least one element selected from Ag, Cu, and B is at least one element selected from S, Se, Te), and more particularly it is composed in the vicinity of the stoichiometric compound of the above three-element system.

Since the recording film material of this invention is fast in the rate of crystallization, it is possible to present an optical information recording medium that can cope with the forthcoming trend of higher transfer rate of signals.

13 Claims, 5 Drawing Sheets

Structure of Recording Medium

OPTICAL INFORMATION RECORDING MEDIUM

This application is a continuation of now abandoned application, Ser. No. 540,445, filed Jun. 15, 1990, which in turn is a continuation of application Ser. No. 07/253,213, filed on Oct. 4, 1998, both applications being now abandoned.

BACKGROUND OF THE INVENTION

This invention relates to an optical information recording medium capable of recording, reproducing and rewriting information signals at high density and high speed by using optical means such as a laser beam.

The technology of recording and reproducing information at high density by using a laser beam is known, and it is presently applied in document filling system, still picture filing system, and others. Rewritable type information recording systems are also researched and developed, and actual cases have been reported. The active layer responsible for recording in optical disk is mainly composed of chalcogen such as Se and Te or its compound (chalcogenide). In these substances, an amorphous phase is obtained relatively easily by heating and cooling, and the optical constant varies between the crystal phase and amorphous phase. By optically detecting this phenomenon, the information is reproduced.

The amorphous phase is obtained, for example, by emitting strong and short pulse laser light to heat the illuminated part up to the liquid phase, and then quenching. On the other hand, the crystal phase is obtained, for example, by emitting weak and long pulse laser light, and heating and gradually cooling the amorphous phase. The change in the optical constant is mainly observed as a change in the reflectivity.

In the case of rewritable type optical disk device, generally, the amorphous phase corresponds to the recording signal, and the crystal phase corresponds to the erased state. That is, the state of the amorphous recording marks arranged on the track in crystal state is the recorded pattern of the information.

As practical conventional examples of recording film material, Te and Ge were used as main materials. This is because Te is stable as a crystal at room temperature, but does not exist in an amorphous state, and Ge is added as an additive in order to stabilize the amorphous state at room temperature.

As optical recording material using mainly Te-Ge, for example, $Ge_{15}Te_{81}Sb_2S_2$ (Appl. Phys. Letters, 18, 254, 1971) is known. In this composition, however, the crystallization (erasure) time is long, about scores of microseconds, and the contrast ratio of recording pattern is not sufficient, and hence it was not satisfactory practically.

Besides, a Te-Ge-Sn-Au alloy (U.S. patent application Ser. No. 890,325) and a Te-Ge-Sb-Se alloy (U.S. patent application Ser. No. No. 909,673) have been also reported. In these compositions, the insufficient characteristics in the Te-Ge compound have been improved. This is considered because Au or Sb works by promote crystallization by partially destroying the strong covalent structure, and the crystallization time is less than several microseconds.

Since the phase change from amorphous to crystal takes a longer time than the phase change from crystal to amorphous generally, shortening of the crystallization time is the key for improving the transfer rate of a signal.

Although recording film materials of which crystallization time is less than several microseconds have been proposed, it is needed to further shorten the crystallization time in order to enhance the performance of optical disk. That is, in the recording film materials proposed so far, the crystallization speed may not be always sufficient, and it may be impossible to apply to higher transfer rate of signals in the future.

SUMMARY OF THE INVENTION

It is hence a primary object of this invention to present a recording film material of a novel composition in order to realize a higher transfer rate of signals, in an optical information recording medium for recording, reproducing and erasing information by causing changes in the optical constant by using light, heat or other means. Practically it is an alloy made of indium (In) and A and B (A is at least one element selected from Ag, Cu, and B is at least one element selected from S, Se, Te), and more particularly it has a composition near the stoichiometric compound of the above three elements.

Since the recording film material of this invention has a high crystallization speed, it is possible to present an optical information recording medium capable of coping with higher transfer rate of signals henceforth.

While the novel features of the invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

In a rewritable optical disk, as stated above, it is important to shorten the time for crystallization, that is, erasing which takes a longer time than recording, in order to enhance the transfer rate of signals.

The present inventors accumulated studies from the viewpoint that, when crystallizing from the amorphous state, the rate of crystallization would be greater when forming single-phase crystals directly from the amorphous phase because the diffusion distance of atoms is shorter, whereas materials undergoing eutectic reaction or peritectic reaction would be smaller in the rate of crystallization because long distance diffusion of atoms is necessary. As a result, as the recording film material, a region of great rate of crystallization was found in three-element systems of InAgTe, InAgSe, InAgS, InCuTe, InCuSe, and InCuS, in the vicinity of stoichiometric compound particularly.

In the above six three-element systems, the stoichiometric compound is located on the line linking $In_2b_3$ and $A_2B$ (A is one selected from Ag, Cu, and B is one selected from S, Se, Te), and therefore the region with great rate of crystallization is present along this line. The region considered to be important as optical recording film is an area enclosed by a, b, c, d in FIG. 1, and it was nearly same in these three-element systems.

Figure 1:
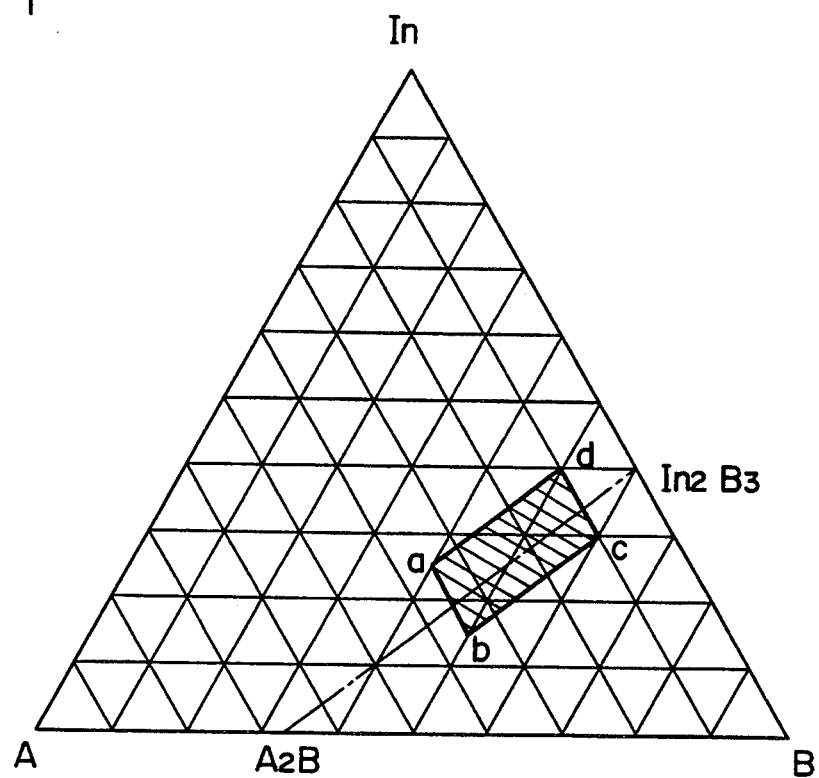
FIG. 1 is a drawing to show the composition range of recording film material according to this invention.

Meanwhile, the compositions at points a, b, c, d in FIG. 1 are as follows.

|   | (In, | A, | B): at % |
|---|------|-----|----------|
| a: | (25, | 35, | 40) |
| b: | (15, | 35, | 50) |
| c: | (30, | 10, | 60) |
| d: | (40, | 10, | 50) |

Furthermore, the part with the greatest rate of crystallization in this region is the vicinity of the stoichiometric compound represented by $InAB_2$, and it was found to become a material for optical disk with a particularly large transfer rate.

Figure 2:
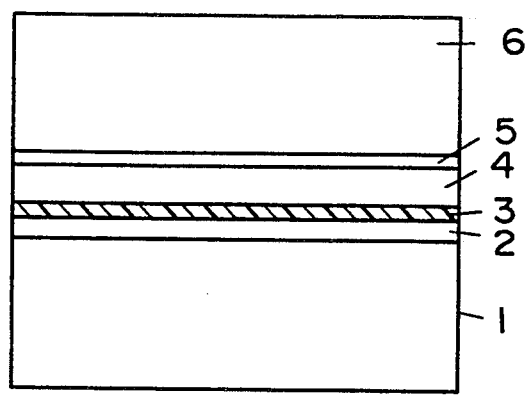
FIG. 2 is a sectional view showing the structure of recording medium.

The recording layer may be formed by vacuum evaporation method or sputtering method, but in the following embodiments it was formed on the transparent substrate by vacuum evaporation method. The recording film after forming is amorphous. The structure of recording medium is shown in FIG. 2, in which numeral 1 is a substrate, 2 is a heat resistant protective layer made of inorganic matter in order to protect the substrate from heat, 3 is a recording layer, 4 is a similar heat resistant protective layer like 2, and a protective substrate 6 is glued by an adhesive 5. The laser light for recording, reproducing and erasing is entered from the substrate 1 side.

The material of the substrate may be glass, quartz, polycarbonate or polymethylmethacrylate (PMMA).

The thickness of recording film is about 100 nm in InAgTe, InAgSe, InAgS, and InCuTe, and 60 nm in InCuSe and InCuS, and the recording film is protected on both sides by silicon dioxide ($SiO_2$) which is heat resistant protective layer. The thickness of this heat resistant protective layer is 100 nm on both substrate side and recording film side.

Meanwhile, the difference in the thickness of recording film is due to the difference in the wavelength of the laser light of the light source used in measurement of threshold value of amorphization and crystallization time; that is, the thickness is 100 nm in the material showing a sufficient absorption at the wavelength of the laser diode (830 nm in this embodiment), and is 60 nm in the material with small absorption, using argon ion laser (central wavelength 515 nm) as light source.

In all the obtained recording films, the power and pulse width of the laser light to initiate crystallization and amorphization were measured.

The crystallization time was measured by static and dynamic methods. In static measurement, a heat resistant protective layer was disposed on PMMA, and a dummy sample was made in the same structure as optical disk. The sample was fixed on the stage and was exposed to laser light spot whose diameter is about 1 μm. Detecting the presence or absence of change in the reflectivity after emitting laser pulse having a pre-determined intensity, the pulse width to initiate the change was determined, which was recorded as the threshold value of crystallization.

The threshold value of amorphization was similarly measured by emitting laser again to once crystallized material.

In the measurement of crystallization and amorphization threshold value, a laser diode was used as light source in InAgTe, InAgSe, InAgS, and InCuTe, and argon ion laser was used in InCuSe and InCuS.

For dynamic measurement, actually fabricating an optical disk, the recording, reproducing and erasing characteristics were measured. Polycarbonate was used as the substrate of optical disk.

This invention is described in further details below by referring to its embodiments.

Embodiment 1

Figure 3:
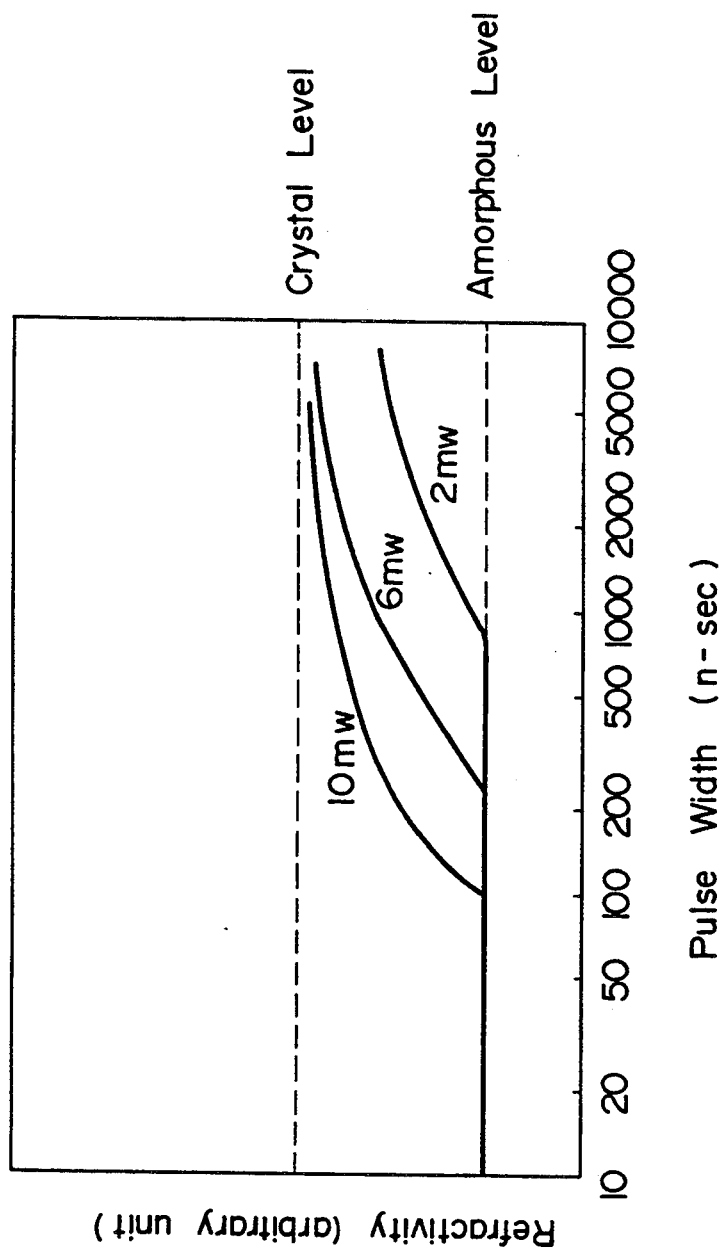
FIG. 3 is a drawing to show the static crystallization characteristics using InAgTe as recording film material.

A recording film was fabricated in a three-element system of InAgTe, and was evaluated about crystallization and amorphization characteristics. As the stoichiometric compound in this three-element system, $InAgTe_2$ and $In_5AgTe_8$ are known, and they are both expressed as mixed composition of stoichiometric compounds $Ag_2Te$ and $In_2Te_3$. Accordingly, on the line linking $Ag_2T_2$ and $In_2Te_3$ and in the composition in its vicinity, a recording film was manufactured by vacuum evaporation method, and the recording characteristics and erasing characteristics were measured. The thickness of recording film was 100 nm, and $SiO_2$ was used as the heat resistant protective layer. FIG. 3 shows the result of recording film in the composition of $In_{30}Ag_{17}Te_{53}$ as an example of crystallization characteristics by static measurement. As shown in the drawing, as the irradiation power was increased film 2 mW to 10 mW, the crystallization starting pulse width shifted to the shorter pulse side. In this embodiment, a crystallization start threshold value of 100 nsec is obtained with a power of 10 mW.

Figure 4:
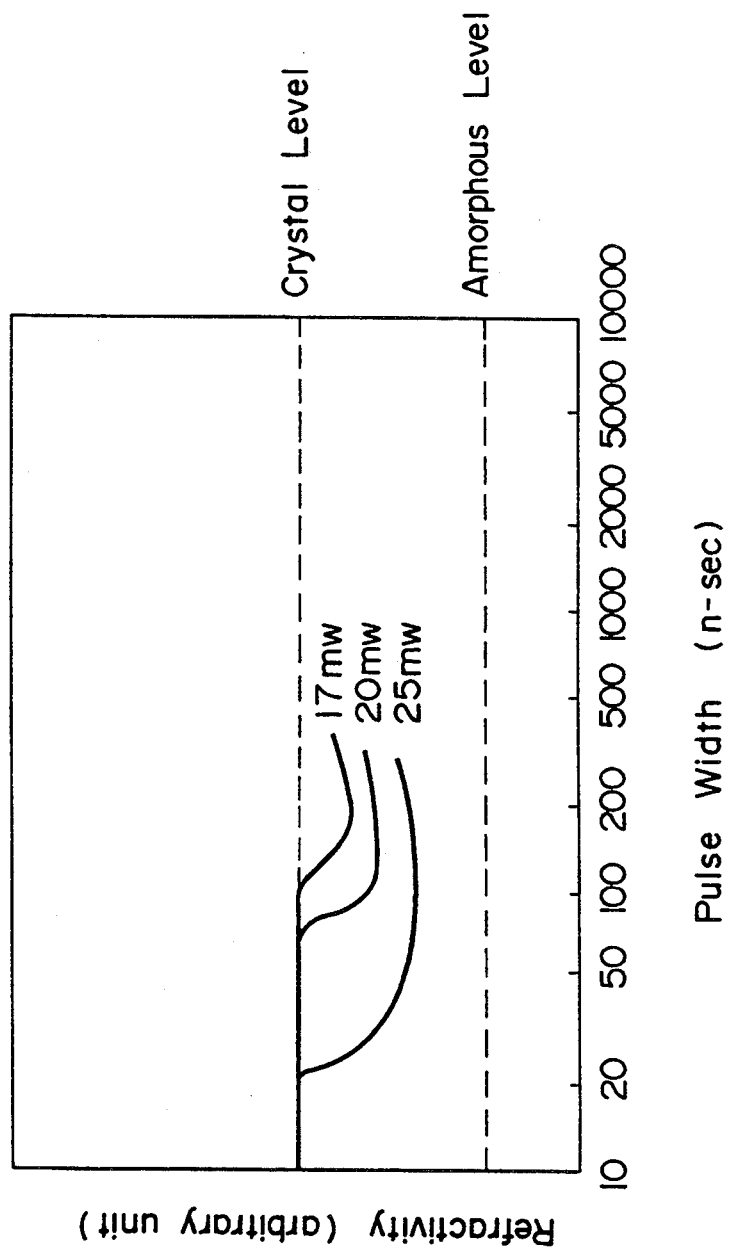
FIG. 4 is a drawing to show the static amorphization characteristics using InAgTe as recording film material.

When the amorphization characteristic was measured, the sample was pre-crystallized by emitting a pulse with a pulse width of 5 μsec and power of 4 mW, and then laser pulse whose power was stronger than the pre-crystallization power was emitted at the same position. As shown in FIG. 4, since the reflectivity was changed at a pulse width of 100 nsec or more with a power of 17 mW or more, it is known that amorphization has been realized.

Table 1 shows the dependence on the composition of the crystallization starting threshold value and amorphization starting threshold value measured in this way. In this case, the threshold value of crystallization is when the laser power is 10 mW, and the threshold value of amorphization is when it is 20 mW.

TABLE 1

| No. | Composition (atom %) | | | Crystallization threshold value 10 mW, n sec | Amorphization threshold value 20 mW, n sec |
|-----|----|----|----|------|----|
|     | In | Ag | Te |      |    |
| 1   | 15 | 42 | 43 | 2000 | 50 |
| 2   | 20 | 33 | 47 | 300  | 50 |
| 3   | 25 | 25 | 50 | 70   | 70 |
| 4   | 30 | 17 | 53 | 100  | 70 |
| 5   | 33 | 12 | 55 | 300  | 70 |
| 6   | 35 | 8  | 57 | 1500 | 70 |
| 7   | 35 | 25 | 40 | 1000 | 50 |
| 8   | 30 | 25 | 45 | 300  | 50 |
| 9   | 20 | 25 | 55 | 1000 | 50 |
| 10  | 15 | 25 | 60 | 5000 | 30 |
| 11  | 25 | 30 | 45 | 500  | 50 |
| 12  | 35 | 15 | 50 | 500  | 50 |

TABLE 1-continued

| No. | Composition (atom %) | | | Crystallization threshold value 10 mW, n sec | Amorphization threshold value 20 mW, n sec |
|---|---|---|---|---|---|
| | In | Ag | Te | | |
| 13 | 25 | 20 | 55 | 700 | 50 |

As cleared from Table 1, supposing A to be Ag and B to be Te in FIG. 1, in the area enclosed by a, b, c, d, both the crystallization threshold value and amorphization threshold value are within 1 μsec, and it is known that signals can be recorded and erased at high speed. In particular, in $In_{25}Ag_{25}Te_{50}$, that is, in the stoichiometric compound of $InAgTe_2$, the crystallization starting threshold value was the minimum.

Similarly, recording films were prepared in three-element systems of InAgSe, InAgS, InCuTe, and were similarly evaluated. As a result it has been known that amorphization and crystallization can be effected reversely by irradiating with laser light in a short time of 1 μsec or less, at least in the area enclosed by a, b, c, d in FIG. 1.

Embodiment 2

A recording film was fabricated in a three-element system of InCuSe, and evaluated. The film was formed on the line linking the stoichiometric compound $Cu_2Se$ and $In_2Se_3$ and the composition in its vicinity, and the recording characteristic and erasing characteristic were measured in the same manner as in Embodiment 1. However, since the recording film of this three-element system does not absorb so much but passes the light in the wavelength of laser diode (about 830 nm), an argon ion laser (central wavelength 515 nm) was used as light source, and the laser light was modulated by using EO modulator, and the recording characteristic and erasing characteristic were measured.

The thickness of the recording film is 60 nm, and $SiO_2$ was used as protective film material.

Table 2 shows the dependence on composition of the threshold value to start crystallization and the threshold value to start crystallization obtained in the same manner as in Embodiment 1. In this case, the threshold value of crystallization is the value when the laser power is 8 mW, and the threshold value of amorphization is the value when it is 16 mW.

It is known from Table 2 that, supposing A to be Cu and B to be Se in FIG. 1, the crystallization threshold value and amorphization threshold value are both within 1 μsec in an area enclosed by a, b, c, d, and it is known that signals can be recorded and erased at high speed.

In this case, too, $InCuSE_2$ which is a stoichiometric compound had the smallest crystallization starting threshold value.

TABLE 2

| No. | Composition (atom %) | | | Crystallization threshold value 8 mW, n sec | Amorphization threshold value 16 mW, n sec |
|---|---|---|---|---|---|
| | In | Cu | Se | | |
| 1 | 15 | 42 | 43 | 1000 | 100 |
| 2 | 20 | 33 | 47 | 300 | 150 |
| 3 | 25 | 25 | 50 | 200 | 200 |
| 4 | 30 | 17 | 53 | 300 | 200 |
| 5 | 33 | 12 | 55 | 500 | 200 |
| 6 | 35 | 8 | 57 | 1000 | 150 |
| 7 | 35 | 25 | 40 | 2000 | 150 |
| 8 | 30 | 25 | 45 | 500 | 200 |
| 9 | 20 | 25 | 55 | 700 | 150 |
| 10 | 15 | 25 | 60 | 1500 | 70 |

TABLE 2-continued

| No. | Composition (atom %) | | | Crystallization threshold value 8 mW, n sec | Amorphization threshold value 16 mW, n sec |
|---|---|---|---|---|---|
| | In | Cu | Se | | |
| 11 | 25 | 30 | 45 | 500 | 200 |
| 12 | 35 | 15 | 50 | 1000 | 150 |
| 13 | 25 | 20 | 55 | 700 | 200 |

Similarly, recording films of InCuS were fabricated and similarly evaluated. As a result, at least in the area enclosed by a, b, c, d in FIG. 1, it has been found that amorphization and crystallization be done reversely by irradiation with laser for a short time of 1 μsec or less.

Embodiment 3

As recording films, four-element systems of InAg-CuTe and InAgTeSe were used, and an experiment was conducted in the same manner as in Embodiment 1. In the InAgCuTe system, however, the concentration ratio of Ag and Cu was fixed at Ag:Cu=7:3, and in the InAgTeSe system, the concentration ratio of Te and Se was fixed at Te:Se=7:3. In this case, the thickness of recording film is 100 nm, and $SiO_2$ is used as heat resistant protective film.

Table 3 shows the dependence on composition of the threshold value to start crystallization and the threshold value to start amorphization of InAgCuTe system obtained in the same manner as in Embodiment 1, and that of InAgTeSe system is shown in Table 4. In this case, the crystallization threshold value is the value when the laser power is 11 mW, and the amorphization threshold value is the value when it is 22 mW.

From Tables 3 and 4 it is known, supposing A to be Ag+Cu and B to be Te+Se in FIG. 1, that the crystallization threshold value and amorphization threshold value are both within 1 μsec in an area enclosed by a, b, c, d, and it is understood that signals can be recorded and erased at high speed. The values are almost same as in the InAgTe system in Embodiment 1, which suggests that signals can be recorded and erased at high speed even if Ag is replaced by Cu and Te by Se.

TABLE 3

| No. | Composition (atom %) | | | Crystallization threshold value 11 mW, n sec | Amorphization threshold value 22 mW, n sec |
|---|---|---|---|---|---|
| | In | Ag + Cu | Te | | |
| 1 | 15 | 42 | 43 | 2000 | 50 |
| 2 | 20 | 33 | 47 | 500 | 50 |
| 3 | 25 | 25 | 50 | 100 | 100 |
| 4 | 30 | 17 | 53 | 200 | 70 |
| 5 | 33 | 12 | 55 | 300 | 70 |
| 6 | 35 | 8 | 57 | 1000 | 50 |

TABLE 4

| No. | Composition (atom %) | | | Crystallization threshold value 11 mW, n sec | Amorphization threshold value 22 mW, n sec |
|---|---|---|---|---|---|
| | In | Ag | Te + Se | | |
| 1 | 15 | 42 | 43 | 3000 | 50 |
| 2 | 20 | 33 | 47 | 500 | 50 |
| 3 | 25 | 25 | 50 | 100 | 70 |
| 4 | 30 | 17 | 53 | 200 | 70 |
| 5 | 33 | 12 | 55 | 500 | 50 |
| 6 | 35 | 8 | 57 | 1500 | 50 |

Embodiment 4

Figure 5:
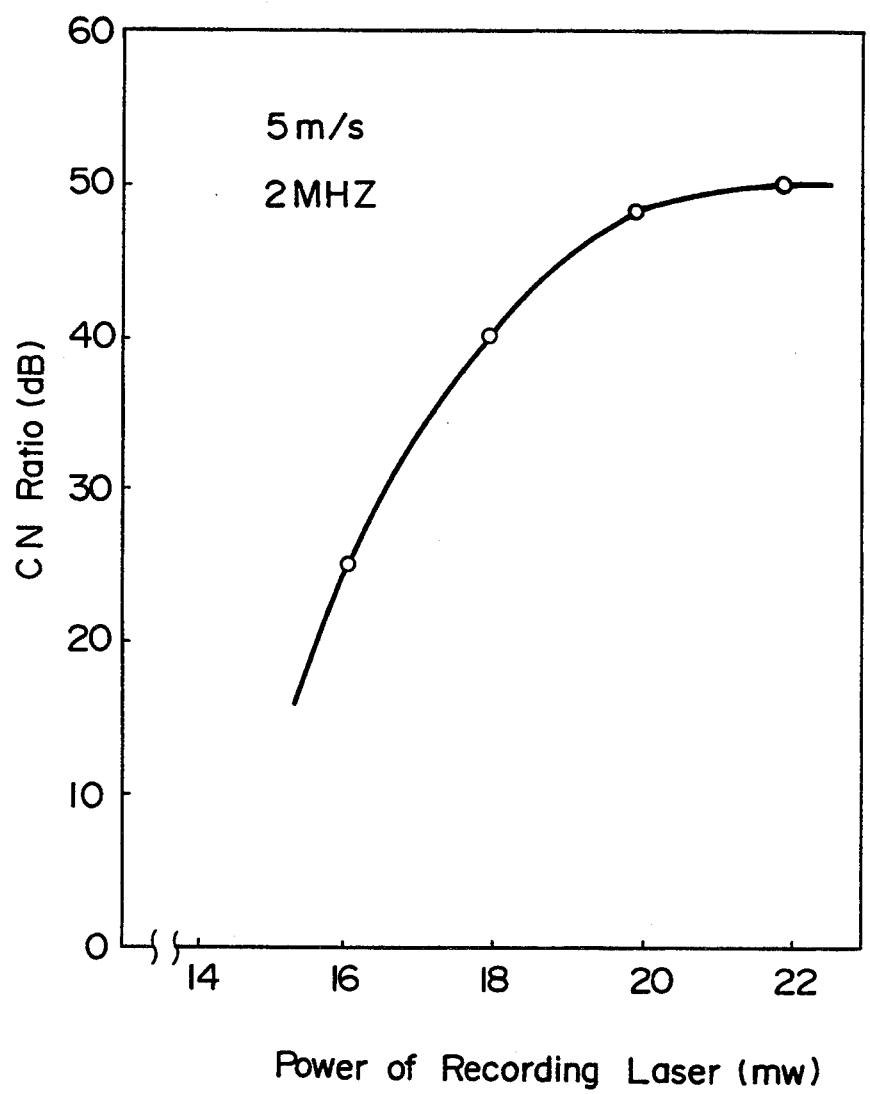
FIG. 5 is a drawing to show the dynamic recording characteristics using InAgTe as recording film material.

As a recording film a film composed of $In_{25}Ag_{25}Te_{50}$ was fabricated by vacuum evaporation method, and dynamic characteristics as optical disk were measured. The thickness of the recording film was 100 nm, and SiO$_2$ was used as the heat resistant protective film. A disk of 5.25 inches was used, and the relative speed of laser beam and disk was 5 m/sec. FIG. 5 shows the relation with the writing power of the CNR (carrier to noise ratio) of recording at frequency of 2 MHz. As cleared from this diagram, the CNR increases as the recording power is increased from 16 mW to 22 mW.

Figure 6:
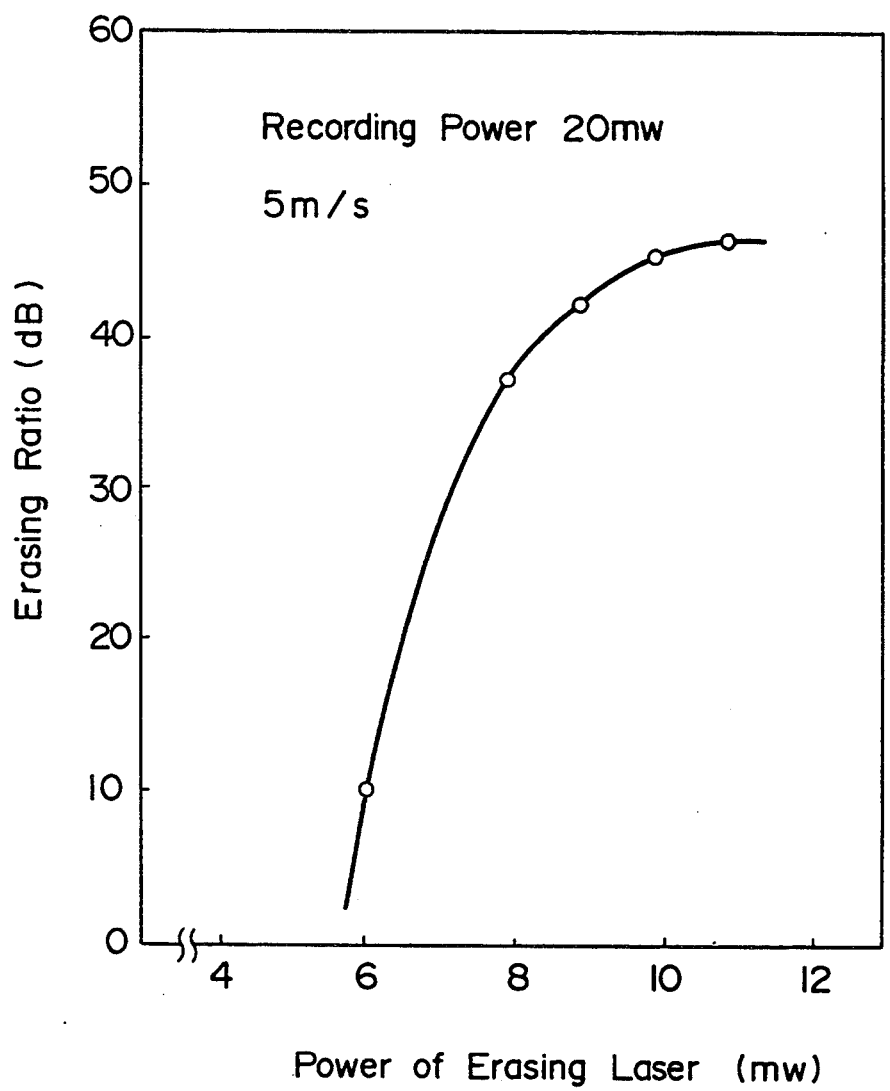
FIG. 6 is a drawing to show the dynamic erasing characteristics using InAgTe as recording film material.

FIG. 6 shows the erasing characteristics of recorded signals. The axis of abscissas shows the power of the erasing laser light, and the axis of ordinates denotes the erasability. The shape of the laser beam for erasing is circular, and the power is in Gaussian distribution. The recording power of signal was 20 mW, and the signal was erased (crystallized) by continuously irradiating with laser light. Since the crystallization time is as short as the signal recording time, it has been known that it is possible to crystallize (erase) sufficiently even in the same laser spot as that for recording signals.

Thus, the optical disk using the recording film according to this invention possesses excellent signal recording and erasing characteristics.

As stated hereabove, since the recording film composed of indium and A and B (A is at least one elment selected from Ag, Cu, and B is at least one element selected from S, Se, Te) is great in the crystallization rate, the erasing rate is fast, and hence the optical disk applicable to higher transfer rate may be obtained.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A rewritable optical information recording medium consisting essentially of a laser light transparent substrate and a recording film, which is formed on said substrate, whereon information is recorded or erased by causing changes in an optical constant of said recording film by irradiating laser light through said substrate, in which material of said recording film is an alloy consisting of indium, A and B, wherein A is at least one element selected from the group consisting of Ag and Cu, and B is selected from the group consisting of S, Se and Te and wherein the composition of said recording film is in an area enclosed by a, b, c and d in FIG. 1, wherein the compositions in percentages at the points a, b, c and d are as follows:

|   | (In, | A, | B) |
|---|---|---|---|
| a: | (25, | 35, | 40) |
| b: | (15, | 35, | 50) |
| c: | (30, | 10, | 60) |
| d: | (40, | 10, | 50). |

2. A rewritable optical information medium according to claim 1 in which B is S.

3. A rewritable optical information medium according to claim 1 in which B is Se.

4. A rewritable optical information medium according to claim 1 in which B is Te.

5. A rewritable optical information recording medium comprising:
- a substrate forming a first recording medium layer;
- a first heat resistive inorganic material forming a second recording medium layer;
- a rewritable recording film, in which information is recorded and erased, forming a third recording medium layer such that said second recording medium layer is interposed between said first and third recording medium layers, said rewritable recording film having an optical constant which is indicative of a current state of recorded information and which is variable in response to incident laser light transmitted through said substrate and said heat resistive inorganic material and being composed of a material which is an alloy consisting of indium, A and B, wherein A is at least one element selected from the group consisting of Ag and Cu, and B is selected from the group consisting of S, Se and Te and wherein the composition of said recording film is in an area enclosed by a, b, c and d in FIG. 1, wherein the compositions in percentages at the points a, b, c and d are as follows:

|   | (In, | A, | B) |
|---|---|---|---|
| a: | (25, | 35, | 40) |
| b: | (15, | 35, | 50) |
| c: | (30, | 10, | 60) |
| d: | (40, | 10, | 50); |

- a second heat resistive inorganic material forming a fourth recording medium layer such that said third recording medium layer is interposed between said second and fourth recording medium layers;
- a second substrate forming a fifth recording medium layer such that said fourth recording medium layer is interposed between said third and fifth recording medium layers; and
- an adhesive layer forming a sixth recording medium layer interposed between fourth and fifth recording medium layers.

6. A rewritable optical information recording medium as claimed in claim 5, wherein said first heat resistive inorganic material is silicon dioxide.

7. A rewritable optical information recording medium as claimed in claim 6, wherein said second heat resistive inorganic material is silicon dioxide.

8. A rewritable optical information medium according to claim 7 in which B is S.

9. A rewritable optical information medium according to claim 7 in which B is Se.

10. A rewritable optical information medium according to claim 7 in which B is Te.

11. A rewritable optical information medium according to claim 5 in which B is S.

12. A rewritable optical information medium according to claim 5 in which B is Se.

13. A rewritable optical information medium according to claim 5 in which B is Te.

* * * * *